Nov. 17, 1953   P. J. McLAREN   2,659,245
SPEED CHANGE TRANSMISSION
Filed Aug. 4, 1951   5 Sheets-Sheet 2

INVENTOR.
PETER J. McLAREN, DECEASED
THE HANOVER BANK, FORMERLY
CENTRAL HANOVER BANK AND TRUST
CO. AND HARRY E. HANSEN, EXECUTORS
BY Moses, Nolte, Crews + Berry
   ATTORNEYS Nov. 17, 1953

P. J. McLAREN 2,659,245

SPEED CHANGE TRANSMISSION

Filed Aug. 4, 1951

INVENTOR.
PETER J. McLAREN, DECEASED
THE HANOVER BANK, FORMERLY
CENTRAL HANOVER BANK AND TRUST
CO., AND HARRY E. HANSEN, EXECUTORS
BY Moses, Nolte, Crews & Berry
ATTORNEYS Nov. 17, 1953

P. J. McLAREN 2,659,245

SPEED CHANGE TRANSMISSION

Filed Aug. 4, 1951

INVENTOR.
PETER J. McLAREN, DECEASED
THE HANOVER BANK, FORMERLY
CENTRAL HANOVER BANK AND TRUST
CO., AND HARRY E. HANSEN, EXECUTOR

BY Moser, Nolte, Crews & Berry
ATTORNEYS

Patented Nov. 17, 1953

2,659,245

UNITED STATES PATENT OFFICE 2,659,245

SPEED CHANGE TRANSMISSION

Peter J. McLaren, deceased, late of New York, N. Y., by The Hanover Bank, formerly Central Hanover Bank and Trust Company, corporate executor, New York, N. Y., and Harry E. Hansen, coexecutor, assignors to The W. L. Maxson Corporation, New York, N. Y., a corporation of New York Application August 4, 1951, Serial No. 240,302

8 Claims. (Cl. 74—690)

The present invention relates to a speed change transmission, and more particularly to an infinitely variable transmission of the type having driving and driven traction cones, at least one of which is of varying diameter, and a power transfer ring arranged between said cones and movable therealong to change the effective drive ratio therebetween.

A primary object of the invention is to provide a new and improved speed adjusting device for an infinitely variable transmission of the general type referred to.

To this end the overlapped and opposed cones are mounted upon parallel axes, are formed with straight generatrices, and are of equal slope so that a straight parallel sided ring space is defined between them, and the interposed ring is shaped to fit into said space. The drive ratio adjusting means is made to comprise a ring guide engageable with the inner and outer faces of the ring at one side of the common plane of the cone axes and is shiftable to tilt the ring in the plane of the ring.

Whenever the drive ratio is maintained uniform the center of the ring lies susbtantially in the common plane of the cone axes. Since the cones are engaged by the ring only along a line which connects the cone axes, the direction of feed of the ring is at right angles to the ring radius which engages the cones so long as the center of the ring lies in the common plane of the cone axes.

Under these conditions no drive component is imparted to the ring tending to displace it radially of the cones. When the guide is shifted to tilt the ring center away from the common plane of the cone axes the direction of feed becomes oblique to the engaged radius of the ring, and a feed component in one direction or the other radially of the cones is imparted to the ring depending upon the direction of the tilting. In either case the bodily shifting of the ring which results is in a direction to swing the ring center back into the common plane of the cone axes, and when that has been achieved a new constant drive ratio is automatically established consistent with the new position of the guide.

It is an important feature of the invention that the ring is guided and controlled solely by the cones in cooperation with a short tilting guide which engages the ring for a short distance only at one side of the common plane of the cone axes.

It is a further important feature of the invention that a plurality of cone and ring combinations is provided and that tilting guides of the kind referred to are provided for all of the rings, together with means for operating the guides simultaneously and identically to bring about concurrent and coordinate adjustment of the drive ratios of the several cone couples.

It is a further feature that each of the shafts has a pair of cones mounted upon it for rotation in unison, one of the pairs of cones extending between and being flanked by the cones of the other pair, the cones of the first pair being mounted with freedom for axial movement and being urged apart by spring means to bear with equal and predetremined force through the associated rings against the flanking cones. This arrangement also has the advantage of providing a structure of extreme simplicity and one in which end thrusts are balanced.

It is a further object to provide a novel drive for assuring bi-directional output from uni-directional input. To this end it is a feature that two cone driven shafts are provided, together with common control means adapted to adjust the drives to the two shafts oppositely so that the speed of one is diminished as the other is increased, and means for differently combining the speeds of said shafts.

Various other objects, features and advantages of the invention will be apparent from the following particular description, and from an inspection of the accompanying drawings, in which.

Figure 1:
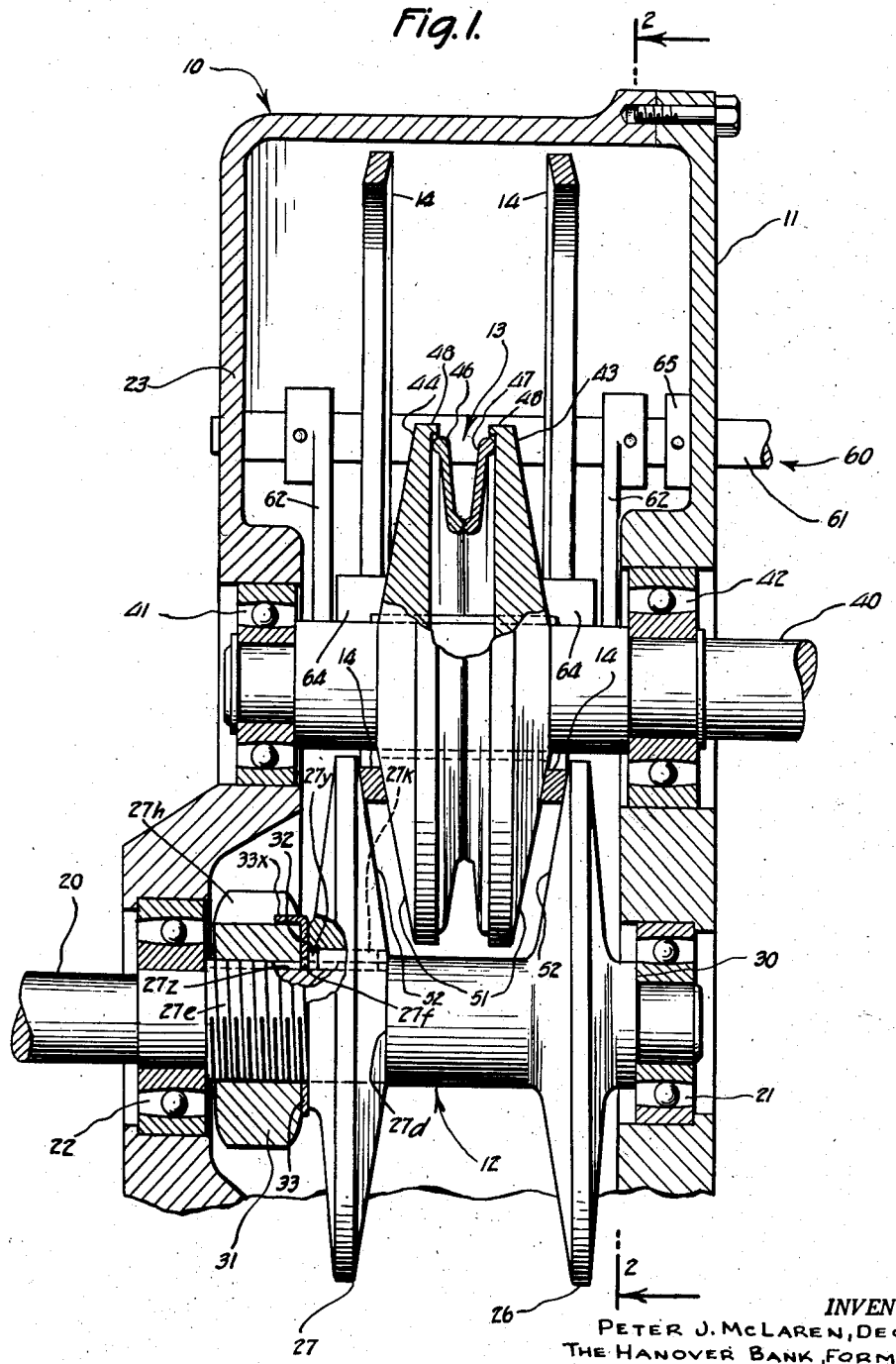
Fig. 1 is a vertical section of a variable speed unidirectional transmission mechanism embodying the present invention.

Referring to Figs. 1 to 6, the unidirectional transmission mechanism is enclosed in a casing or box 10 having a removable side cover 11 by which access to the interior of said casing is easily attained. Mounted in the casing 10 is a driving cone traction assembly 12, a driven cone traction assembly 13, two power transfer annular elements or rings 14 interposed between said assemblies and a speed adjusting device 16.

The driving cone traction assembly 12 comprises a drive shaft 20 shown mounted at one end in suitable bearings 21 in the cover 11, and shown mounted at a section spaced from said end in suitable bearings 22 in a wall 23 of said casing opposite said cover. The shaft 20 extends through the casing wall 23 to receive the power input.

The driving cone assembly 12 also comprises a traction cone 26 desirably formed integral with the shaft 20 and a separate traction cone 27, secured to said shaft for rotation therewith and for sliding movement therealong, by means of a key 27k which is received in a groove 27y of the cone 27 and in a groove 27z of the shaft. The cone 27 bears against a shoulder 27d of the shaft. A nut 31 bears against the cone 27 through a lock washer 33, the nut being screwed onto a threaded portion 27e of the shaft. The washer 33 has an internal tooth 27f lodged in the groove 27z to hold the washer against turning relative to the shaft. After the nut 31 is turned home, an ear 33x on the washer is folded down to lie in a notch 27h of the nut 31 to prevent turning of the nut relative to the shaft. The driving cone 26 has an axially facing shoulder 30 abutting the bearing unit 21, to limit the axial movement of the shaft 20 in one direction.

The driven cone traction assembly 13 comprises a driven shaft 40 mounted at one end in suitable bearings 41 in the casing wall 23, and mounted at a section spaced from said end in suitable bearings 42 in the cover 11. The driven shaft 40 is parallel to and above the driving shaft 20, and extends through the cover 11 for output power take-off.

The driven cone traction assembly 13 also comprises two driven traction cones 43 and 44 splined to the shaft 40 for rotation therewith and for sliding movement therealong. Two Belleville spring plates 46 and 47 loosely confined at their outer peripheries by flanges 48 on the respective traction cones 43 and 44, abut at their inner peripheries, and function normally to exert forces axially outwardly in opposite directions on said discs.

The two driven traction cones 43 and 44 extend downwardly between the two driving traction cones 26 and 27 to a region near the driving shaft 20, and have respective outer convex conical traction surfaces 51 of wide angle. The two driving traction cones 26 and 27 have respective inner facing traction surfaces 52 of wide-angled convex conicity complementing that of the respective traction surfaces 51 of the traction discs 43 and 44, so that in the common plane of the axes of the two shafts 20 and 40, the generating elements of said surfaces 51 and 52 will be parallel.

The power transfer elements 14 in the form of axially aligned circular rings, are made desirably of metal, and are preformed in conical shape to conform with the conicity of the traction surfaces 51 and 52, as shown in Fig. 1, between which these elements are interposed. These power transfer rings 14 encircle the driven shaft 40, and extend in planes substantially at right angles to the axis of said shaft. During normal running operations, the power transfer rings 14 are located in diametrical alignment with the plane passing through the axes of the shafts 20 and 40, and through the lines of engagement of said rings with the cones 26, 27, 43 and 44, as shown in Fig. 2.

The speed ratio between the driving and driven assemblies 12 and 13 of the transmission may be changed by moving the power transfer rings 14 along the traction surfaces of the two sets of rings 26, 27 and 43, 44, to change the effective diametrical ratio between these two assemblies. The speed adjusting device for this purpose comprises a shaft 60 journalled in the casing cover 11 and the casing wall 23, and having an end section 61 extending to the outside of the casing 10 to receive a suitable adjusting handle (not shown). The shaft is shouldered to bear against the casing 23 at one end. A collar 65 fast on the shaft bears against the cover 11 to restrain the shaft against axial movement. Secured to the shaft 60 in the inside of the casing 10 are two similar arms 62 pivotally carrying near their outer ends respective short bearing guides 64 for respective power transfer rings 14. These guides 64 are connected to the outer ends of the respective arms 62 by means of pivot screws 66, each of which has a smooth shank portion passing through the respective arm with a rotative fit, and a threaded end portion screwed into the associated guide. The guides 64 are formed with respective arcuate slots 67 receiving respective rings 14 with a slide fit, so that these guides serve not only as supports, guides and slide bearings for the rings during normal running operations, but also as means by which these rings may be tilted for speed ratio adjustments.

Figure 2:
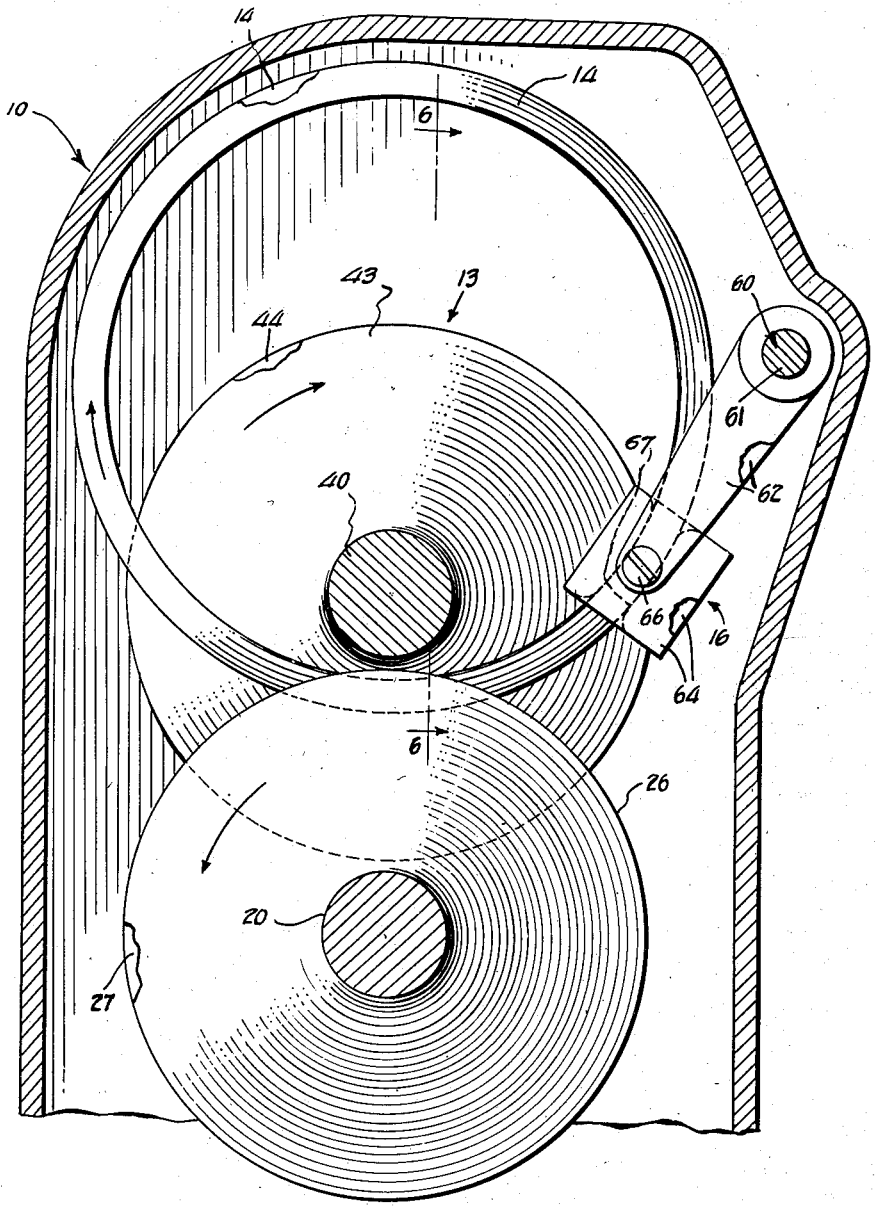
Fig. 2 is a section of the variable speed transmission mechanism of Fig. 1 taken on line 2—2 of Fig. 1.
Figure 5:
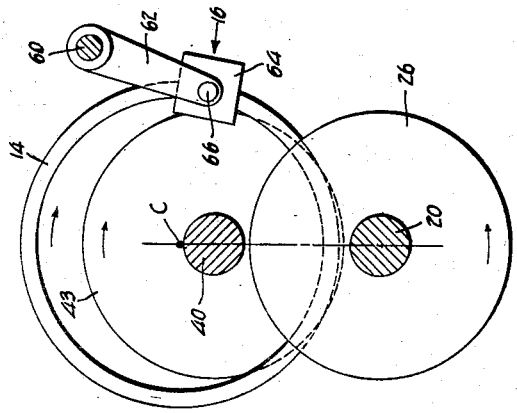
Figs. 3, 4 and 5 are successive operating views on a smaller scale than Figs. 1 and 2, showing successive positions assumed by the parts in effecting a change of drive ratio.
Figure 4:
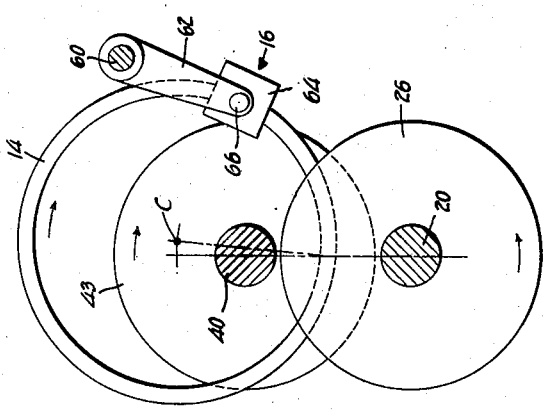
Figure 3:
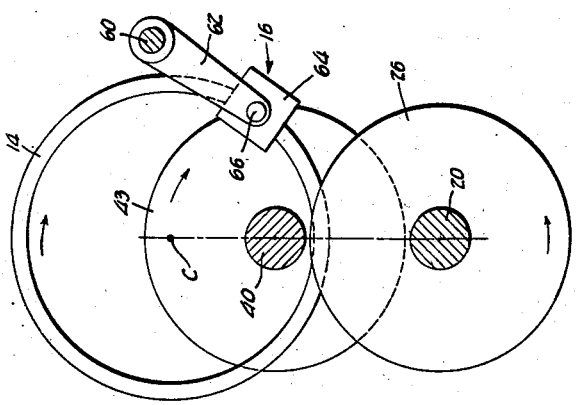

As shown in Figs. 1, 2 and 3, the rings 14 are positioned for constant maximum output speed, and the directions of rotation of the different parts are as indicated. When, for example, it is desired to reduce the output speed to the minimum without changing the input speed, the shaft 60 is turned counterclockwise (Fig. 4), and the rings 14 by means of the arms 62, and the guides 64 are tipped or tilted edge wise in a clockwise direction about regions near the lines of engagement between said rings and the traction surfaces 51 and 52. This shifts the ring center C to the right of the common plane of the cone axes as shown in Fig. 4, causing the cone-engaged diameter of each ring to extend downward toward the left. This induces the cones to feed the rings downward. Since one point in the path of each ring must coincide with the new position of the axis of pivot screw 66, this pushing downward of the rings produces a counterclockwise turning of the rings about the common axis of pivot screws 66 until the centers of the rings have been returned to the common axial plane of the shafts 20 and 40, as shown in Fig. 5. When this occurs there is no longer any component tending to feed the rings up or down. A new drive ratio is, therefore, stably maintained, characteristic of the new positions of the guide blocks 64.

In Fig. 4 the arm 62 is shown as already swung to the final position characteristic of the minimum output speed although the ring has only been shifted down about half way. In actual practice the operation of the shaft 60 would be smooth and gradual, and not jerky or sudden as suggested by Fig. 4. The shifting of the ring would follow up the gradual shifting of shaft 60, and the center of the ring would never be as far off the line of centers of the shafts as shown in Fig. 4.

It is an important point that the ring guides engage the rings as the rings approach engagement with the cones, and in each instance within a quadrant of the point of cone engagement. This is an essential relationship. The rings will not be properly guided and controlled unless the guides are located in the lead-in quadrant of the ring.

In the assembling of the transmission, with the driven traction discs 43 and 44 on the driven shaft 40, the driving traction disc 27 on the driving shaft 20 and the power transfer rings 14 and 15 in position, the nut 31 is turned on the threaded portion 27e of said driving shaft 20. Since the driving disc 26 is held against axial movement in one direction by the engagement of the shoulder with the bearing unit 21, and since the driven discs 43 and 44 are slidable along the driven shaft 40, the tightening of the nut 31 causes these discs to be pressed against the power transfer rings 14 and 15, and the spring plates 46 and 47 to be pressed at their inner peripheries. These spring plates 46 and 47 will thereby apply outward axial spring pressure against the driven discs 43 and 44, so that the power transfer rings 14 and 15 will be frictionally gripped by the traction discs 26, 27, 43 and 44 under resilient pressure. The extent of this pressure is determined by the position of the nut 31 which can be locked in this position by the washer 32.

The power transfer rings 14 and 15 have slight transverse flexibility, so that they will flex into conforming engagement with the traction surfaces 51 and 52 of the discs in case of slight irregularities.

Figure 7:
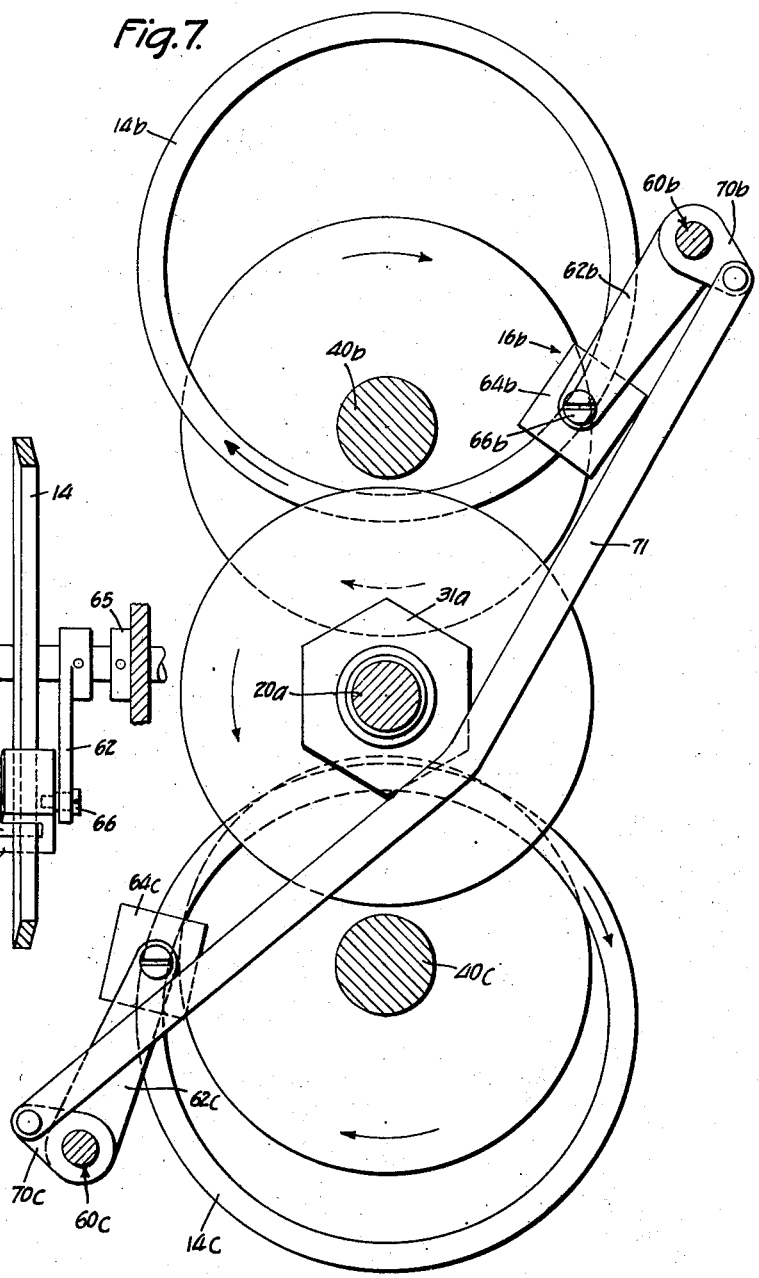
Fig. 7 is a view in transverse sectional elevation of a bi-directional drive mechanism embodying the invention, the section being taken on the line 7—7 of Fig. 8, looking in the direction of the arrows.
Figure 6:
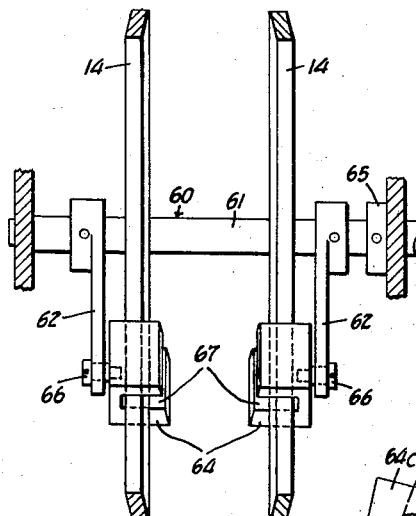
Fig. 6 is a sectional detail view taken on the line 6—6 of Fig. 2, looking in the direction of the arrows.
Figure 8:
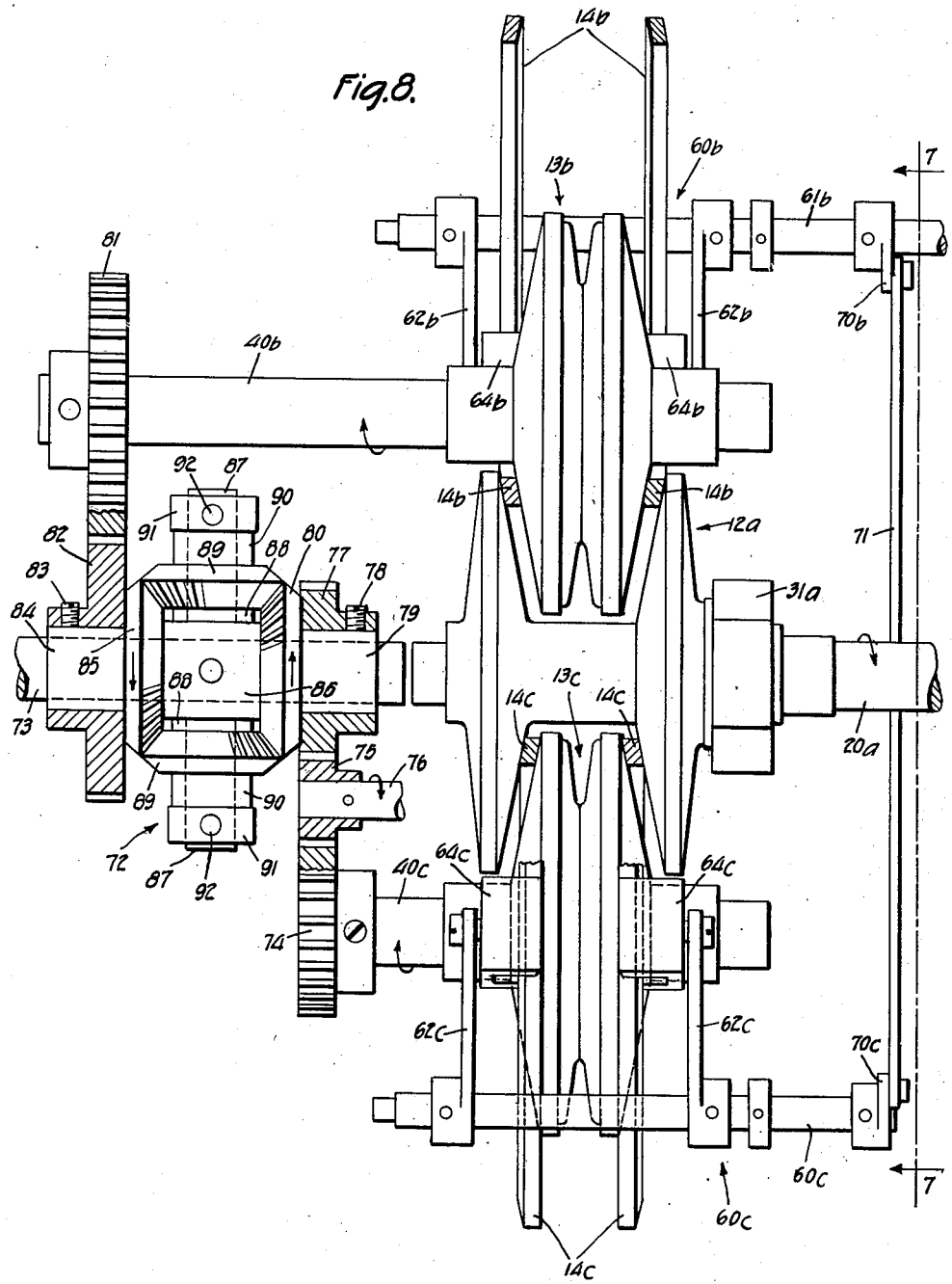
Fig. 8 is a view in side elevation of the bi-directional drive of Fig. 7.

In Figs. 7 and 8 disclosure is made of a drive mechanism employing the principle of the structure disclosed in Figs. 1 to 6, but adapted to secure an infinitely variable bi-directional output from a unidirectional input.

In Figs. 7 and 8 an input shaft 20a may be operated at constant speed in a fixed direction, as indicated by the arrow. The shaft 20a has secured upon it a cone traction assembly 12a which may advantageously be in all respects identical with the cone traction assembly 12 of Figs. 1 and 2. The assembly 12a acts through rings 14b and a traction cone assembly 13b to transmit motion to a driven shaft 40b at variable speed but in a direction opposite to the direction of rotation of the shaft 20a. The cone assembly 13b, the rings 14b and the shaft 40b may all advantageously be identical, respectively, with the cone assembly 13, the rings 14 and the shaft 40 of Figs. 1 and 2.

The cone assembly 12a also acts through rings 14c and a cone assembly 13c to drive a shaft 40c at variable speed, but in the direction opposite to the direction of rotation of the shaft 20a. The rings 14c, the cone assembly 13c, and the shaft 40c may all advantageously be identical, respectively, with the rings 14, the cone assembly 13, and the shaft 40 of Figs. 1 and 2.

It will be observed that the shafts 40b and 40c always run in the same direction. They are, however, driven through different trains and may be adjusted to run at different speeds.

A speed adjusting device 16b for shaft 40b is desirably identical with the speed adjusting device 16 for the shaft 40 of Figs. 1 and 2. Corresponding reference numerals have, therefore, been applied to corresponding parts with the subscript "b" added in each instance. A speed adjusting device 16c for the shaft 40c is desirably identical with the speed adjusting device 16 for the shaft 40 of Figs. 1 and 2. Corresponding reference characters have accordingly been applied to corresponding parts with the subscript "c" added in each instance.

The adjusting devices are interconnected in such a manner as to compel the drive ratio to the shaft 40b to be increased as the drive ratio to the shaft 40c is diminished, and the drive ratio to the shaft 40b to be diminished as the drive ratio to the shaft 40c is increased.

The arms 62b which carry the guide blocks 64b are secured upon the shaft 60b to extend downward and to the left, while the arms 62c which carry the guide blocks 64c are secured upon the shaft 60c to extend upward and to the right. A crank arm 70b is secured upon the shaft 60b, and, as shown in Fig. 7, it extends to the right from the shaft 60b. A similar crank arm 70c is secured upon the shaft 60c substantially at right-angles to the arm 62c and, as shown in Fig. 7, it extends toward the left from the shaft 60c. A link 71 is pivotally connected at its opposite ends to the respective crank arms 70b and 70c to compel the crank arms 62b and 62c to be operated simultaneously and coordinately.

As shown in Fig. 7, the rings 14b are in their uppermost positions to produce the maximum output rate of the shaft 40b. The rings 14c are also shown in their uppermost positions to produce the minimum output rate of shaft 40c. Rotation of the shaft 60c in a clockwise direction will shift the guide blocks 64c toward the common axial plane of the shafts 20a and 40c, and will induce a feeding downward of the rings 14c to increase the rate of output of the shaft 40c. Such movement of the shaft 60c will produce an upward thrust of the link 71 to cause the shaft 60b to be turned counterclockwise. Such turning of the shaft 60b will swing the guide block 64b further away from the common axial plane of the shafts 40b and 20a, and will induce the rings 14b to be fed downward to diminish the output rate of the shaft 40b.

In the midway position of the link 71, the rings 14b and 14c will produce identical output rates of the shafts 40b and 40c, these rates coinciding with the input rate of the shaft 20a. The outputs of the shafts 40b and 40c are combined through a differential gear 72 to produce bi-directional output of a common output shaft 73.

The shaft 40c has fast upon it a gear 74, which drives a gear 75 fast on an intermediate shaft 76. The intermediate gear in turn drives a gear 77 which is secured by a set screw 78 upon the hub 79 of a bevel gear 80. The bevel gear 80 constitutes one of the input gears of the differential 72. The gears 74 and 77 are equal gears, and hence the input gear 80 of the differential 72 is compelled at all times to turn in the same direction as the shaft 40c and at the same rotary speed as the shaft 40c.

The shaft 40b has fast upon it a gear 81 which drives an equal gear 82. The gear 82 is secured by a set screw 83 upon the hub 84 of a bevel gear 85 which constitutes the second input gear of the differential 72. Since the gears 81 and 82 are equal gears and mesh directly with one another, the bevel gear 85 will always be driven at the rotary speed of the shaft 40b but in the opposite direction from that in which the shaft 40b turns.

The bevel gears 80 and 85 are identical gears. They are coaxially mounted upon the shaft 73, each with freedom for rotation relative to the shaft 73. The shaft 73 has fixed upon it a block 86 which carries aligned stub shafts 87. On each stub shaft 87 there are successively mounted a washer 88, a bevel gear 89 having a hub 90, and a collar 91. The collar 91 is secured to the shaft 87 by a pin 92. The bevel gears 89 are rotatable about the common axis of the stub shafts 87, and mesh with the bevel gears 80 and 85, the arrangement and operation being that of the well understood, conventional bevel gear differential.

Since the shafts 40b and 40c always turn in the same direction, but have their rotations transmitted with opposite effect to the bevel gears 80 and 85, it is evident that when the speeds of the shafts 40b and 40c are equal, the output to the shaft 73 will be zero. When the shaft 40c travels faster than the shaft 40b, the output to the shaft 73 will be in the direction of the shaft 40c, and will be equal to one-half the difference of speeds of the shafts 40c and 40b. When the speed of the shaft 40c is less than that of the shaft 40b, the output to the shaft 73 will be in the direction opposite to that in which the shaft 40c turns, and will again be equal to one-half the difference of the speeds of the shafts 40c and 40b. Since the speeds of the shafts 40b and 40c are capable of infinite variation and are reciprocally controlled, it is evident that an infinitely variable output speed, within limits, of the shaft 73 can be obtained in either direction, simply by adjustment of the common speed adjusting means. An operating handle, not shown, may be provided on either the shaft 60b or the shaft 60c.

While the invention has been described with particular reference to a specific embodiment, it is to be understood that it is not to be limited thereto, but is to be construed broadly and restricted solely by the scope of the appended claims.

What is claimed is:

1. An infinitely variable speed change transmission comprising a driving cone, a driven cone mounted with its axis parallel to the axis of said driving cone, a power transfer ring between said cones and having its sides in frictional, drive-transmitting engagement therewith, and means engaged with the inner and outer faces of a limited sector of the ring and movable in the plane of the ring and transversely of the common plane of the cone axes for tilting said ring in its own plane to induce the ring to be fed by the cones to a new position radially of the cones, and thereby to change the speed ratio between said cones.

2. An infinitely variable speed change transmission comprising a driving cone, a driven cone mounted with its axis parallel to the axis of the driving cone, a power transfer ring between said cones and having its sides in frictional, drive-transmitting engagement therewith, and its center normally in the common plane of the cone axes, a short ring guide engageable with the inner and outer faces of the ring in a single limited sector at one side of the common plane of the cones axes, and means for shifting the guide to tilt the center of the ring out of the common plane of the cone axes to induce the ring to be fed by the cones to a new position consistent with the changed position of the guide and in which the center of the ring is restored to the common plane of the cone axes, the ring being thereby shifted radially of the cones to change the speed ratio of the cones.

3. An infinitely variable speed change transmission comprising a driving cone, a driven cone mounted with its axis parallel to the axis of the driving cone, a power transfer ring between said cones and having its sides in frictional, drive-transmitting engagement therewith and its center normally in the common plane of the cone axes, and means engaged with inner and outer faces of a limited sector of the ring and operable to tilt the ring in its own plane in a direction to carry its center away from the common plane of the cone axes, thereby to induce the cones to feed the ring to a new position radially of the cones to change the speed ratio of the cones.

4. An infinitely variable speed change transmission comprising a driving cone, a driven cone mounted with its axis parallel to the axis of the driving cone, a power transfer ring between said cones and having its sides in frictional, drive-transmitting engagement therewith and its center normally in the common plane of the cone axes, and means for tilting the ring in a direction to carry its center out of the common plane of the cone axes, thereby to induce the cones to feed the ring to a new position radially of the cones to change the speed ratio of the cones, said ring tilting means comprising an arm movable in a plane at right angles to the cone axes, and a ring guide pivoted on the arm, said guide formed with an arcuate channel engageable with the inner and outer faces of the ring and of substantial depth to accommodate axial movement of the ring which occurs as an incident of the radial movement thereof.

5. An infinitely variable speed change transmission comprising a plurality of driving cones, a plurality of coaxial driven cones, the driving and driven cones being mounted to provide confronting cone faces and having their axes disposed in parallel relation, power transfer rings disposed between the respective confronting pairs of cones and having their sides in frictional, drive-transmitting engagement therewith, each ring normally having its center disposed in the common plane of the axes of the driving and driven cones engaged by it, and means for simultaneously tilting the centers of the rings away from said normal positions, to induce the rings to be fed by the cones concurrently and coordinately to new positions radially of the cones, thereby to change the speed ratio between the confronting pairs of driving and driven cones identically, said tilting means comprising single guides each engageable with inner and outer face portions of the respective rings through a short segment only, a common actuator, and connections for causing the actuator to operate the guides coordinately.

6. An infinitely variable speed transmission comprising a driving cone, a driven cone mounted with its axis parallel to the axis of said driving cone, a power transfer ring between said cones and having its sides in frictional, drive transmitting engagement therewith, and means engageable with the inner and outer faces of the ring as the ring approaches engagement with the cones and within a quadrant of the point at which said cone engagement occurs, and movable in the plane of the ring for tilting the ring in its own plane to induce the ring to be fed by the cones to a new position radially of the cone, thereby to change the speed ratio between the cones.

7. An infinitely variable speed transmission for securing bi-directional output from unidirectional input comprising, in combination, a driving shaft, a first driven shaft, a first cone and ring combination for driving the first driven shaft from the driving shaft, a second driven shaft, a second cone and ring combination for driving the second driven shaft from the driving shaft, means for differentially combining the outputs of said shafts, and a common control for the rings of said first and second cone and ring combinations to change their drive ratios oppositely, comprising ring guides engageable with the leading quadrants of the respective rings, operating shafts for the respective guides, and means interconnecting the shafts to compel one guide to move toward and from the axis of the driven shaft associated with it.

8. An infinitely variable speed transmission for securing bi-directional output from unidirectional input comprising, in combination, a driving shaft, a first driven shaft, a first cone and ring combination for driving the first driven shaft from the driving shaft, a second driven shaft, a second cone and ring combination for driving the second driven shaft from the driving shaft, the rings having their sides engaged by the associated cones, means for simultaneously adjusting the rings of the two cone and ring combinations to increase the drive ratio to the first driven shaft as the drive ratio to the second driven shaft is diminished, and to diminish the drive ratio to the first driven shaft as the drive ratio to the second driven shaft is increased, comprising ring tilting guides for tilting the respective rings in their own planes and a connection between said guides for compelling a drive ratio increasing tilt of one guide and a drive ratio decreasing tilt of the other guide to occur simultaneously, and means for differentially combining the outputs of the two driven shafts.

THE HANOVER BANK (Formerly Central Hanover Bank and Trust Company),
Corporate executor of the estate of Peter J. McLaren, deceased,
By ROBERT M. LOVELL,
Vice President.

References Cited in the file of this patent

UNITED STATES PATENTS

| Number | Name | Date |
|---|---|---|
| 2,089,295 | Pollard | Aug. 10, 1937 |
| 2,151,042 | McGrath | Mar. 21, 1939 |
| 2,233,967 | Wellton | Mar. 4, 1941 |
| 2,593,510 | Wildhaber | Apr. 22, 1952 |

FOREIGN PATENTS

| Number | Country | Date |
|---|---|---|
| 43,689 | Austria | Aug. 25, 1910 |
| 706,329 | Germany | May 23, 1941 |